United States Patent
Hung et al.

(10) Patent No.: US 10,938,088 B2
(45) Date of Patent: Mar. 2, 2021

(54) BASE COVERS ALIGNED FOR SLOT ANTENNAS ON CONVERTIBLE COMPUTING DEVICES

(71) Applicant: HEWLETT-PACKARD DEVELOPMENT COMPANY, L.P., Spring, TX (US)

(72) Inventors: Kuan-Jung Hung, Taipei (TW); Shih Huang Wu, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,495

(22) PCT Filed: Jul. 7, 2017

(86) PCT No.: PCT/US2017/041235
§ 371 (c)(1),
(2) Date: Jul. 29, 2019

(87) PCT Pub. No.: WO2019/009924
PCT Pub. Date: Jan. 10, 2019

(65) Prior Publication Data
US 2020/0127365 A1      Apr. 23, 2020

(51) Int. Cl.
*H01Q 1/22* (2006.01)
*G06F 1/16* (2006.01)
*H01Q 13/10* (2006.01)

(52) U.S. Cl.
CPC ......... *H01Q 1/2266* (2013.01); *G06F 1/1618* (2013.01); *H01Q 13/106* (2013.01)

(58) Field of Classification Search
CPC .... H01Q 1/2266; H01Q 1/2291; H01Q 13/10; H01Q 13/106; G06F 1/1618; G06F 1/1698; G06F 1/1616; G06F 1/162; G06F 1/1643; G06F 1/1679; G06F 1/1681; H04M 1/026; H04M 1/0202; H04M 1/0206; H04M 1/0214; H04M 1/0225; H04M 1/0227; H04M 1/0231; H04M 1/0233

See application file for complete search history.

(56) References Cited

U.S. PATENT DOCUMENTS

| 5,933,330 A * | 8/1999 | Beutler ............... H04M 1/0262 361/814 |
| 6,903,927 B2 | 6/2005 | Anlauff |
| 8,102,321 B2 * | 1/2012 | Chiang ................... H01Q 9/16 343/702 |

(Continued)

OTHER PUBLICATIONS

Su, S., Two-Patch-PIFA System with Comparable Polarization Radiation for Tablet-computer Applications with Complete, Metal Back Cover, Sep. 23, 2013 < http://onlinelibrary.wiley.com/doi/10.1002/mop.27996/abstract >.

*Primary Examiner* — Haissa Philogene
(74) *Attorney, Agent, or Firm* — Rahman LLC

(57) ABSTRACT

An example base cover for a lower housing of a convertible computing device includes a first metallic structure positioned in the lower housing, and a second metallic structure electrically isolated from the first metallic structure. The second metallic structure is positioned in the lower housing and directly below an antenna slot defined in an upper housing of the convertible computing device when the upper housing is positioned over and parallel to the lower housing.

15 Claims, 10 Drawing Sheets

(56) References Cited

U.S. PATENT DOCUMENTS

| | | | |
|---|---|---|---|
| 9,223,342 B2 | 12/2015 | Chang et al. | |
| 9,264,090 B2 * | 2/2016 | Johnson | H04M 1/0206 |
| 9,509,041 B2 * | 11/2016 | Yan | H01Q 1/243 |
| 9,559,425 B2 * | 1/2017 | Zhu | G01V 3/00 |
| 9,935,357 B2 * | 4/2018 | Bologna | H01Q 1/2291 |
| 10,218,077 B2 * | 2/2019 | Lepe | H01Q 1/243 |
| 10,403,960 B2 * | 9/2019 | Sultenfuss | H01Q 1/2266 |
| 10,727,590 B2 * | 7/2020 | Barrera | H01Q 13/106 |
| 2011/0115735 A1 | 5/2011 | Lev et al. | |
| 2011/0260931 A1 | 10/2011 | Tsai et al. | |
| 2013/0271378 A1 | 10/2013 | Hulford | |
| 2014/0184512 A1 | 7/2014 | Okuley et al. | |
| 2014/0347239 A1 | 11/2014 | Pan | |
| 2016/0154438 A1 | 6/2016 | Sato | |
| 2017/0012342 A1 | 1/2017 | Lai et al. | |

\* cited by examiner

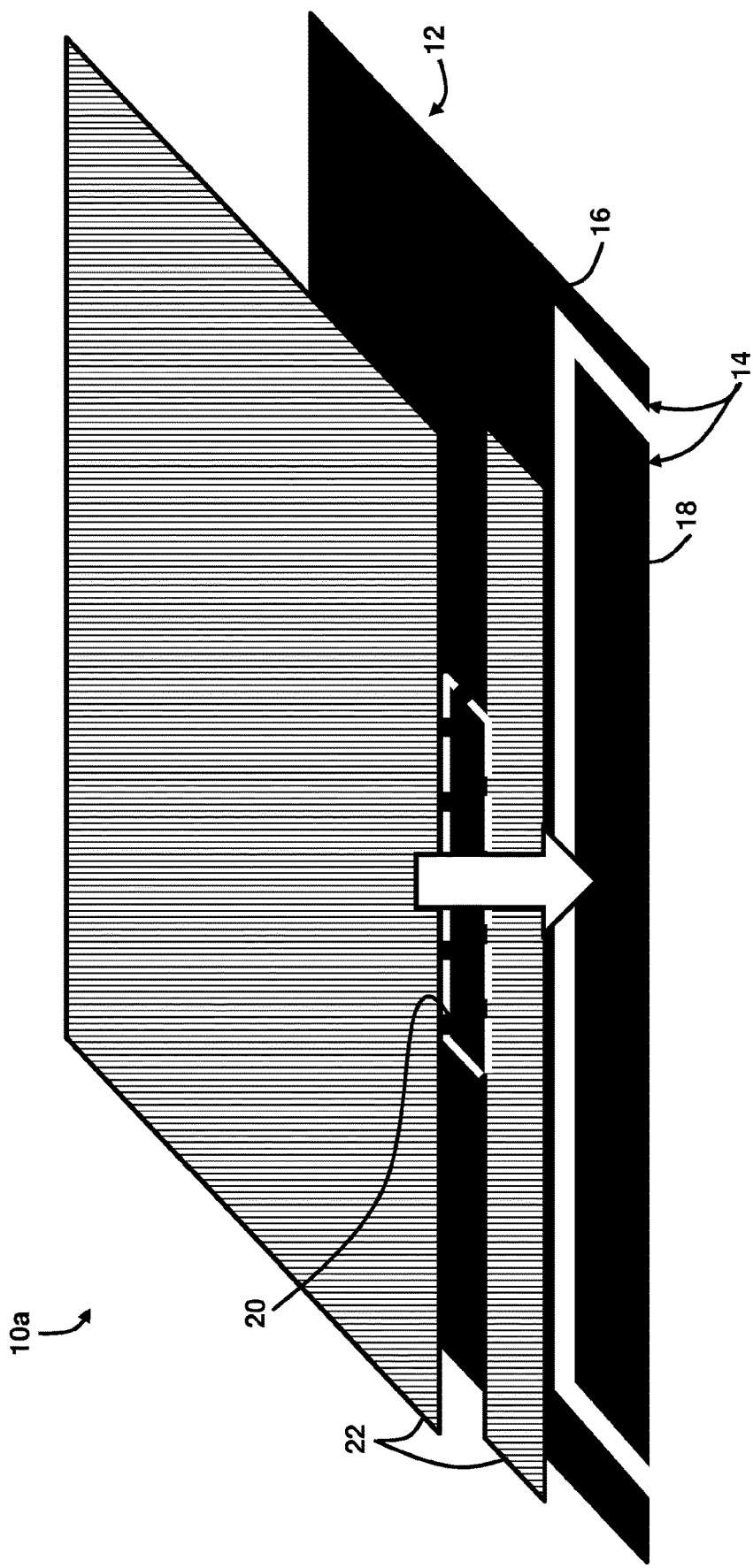

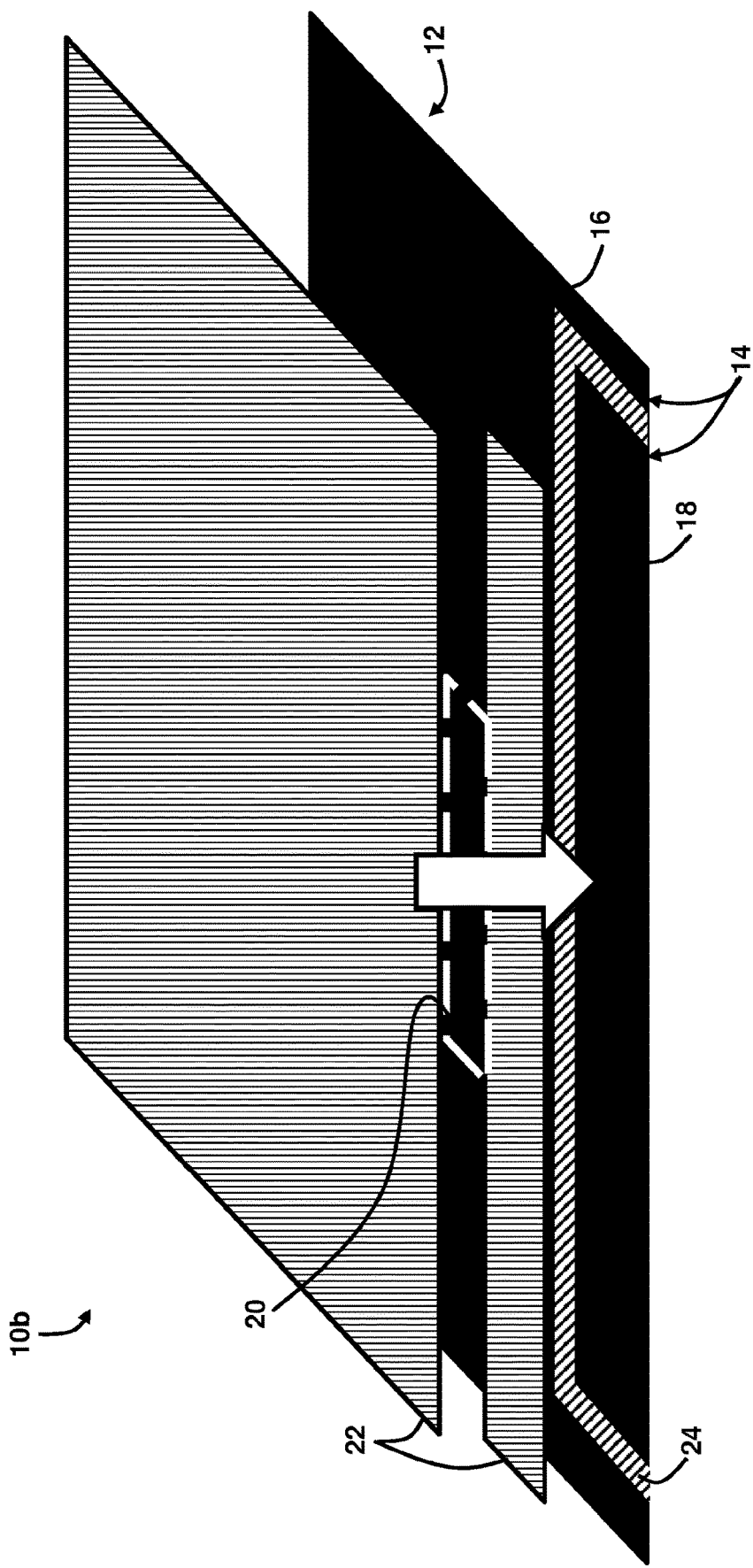

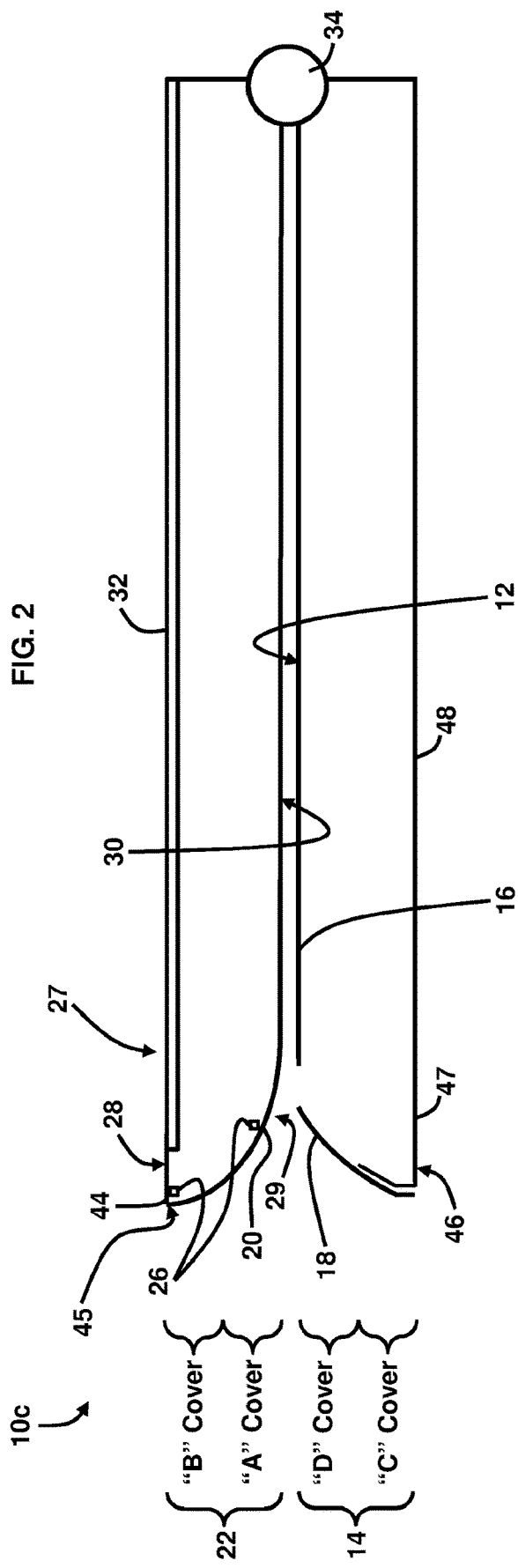

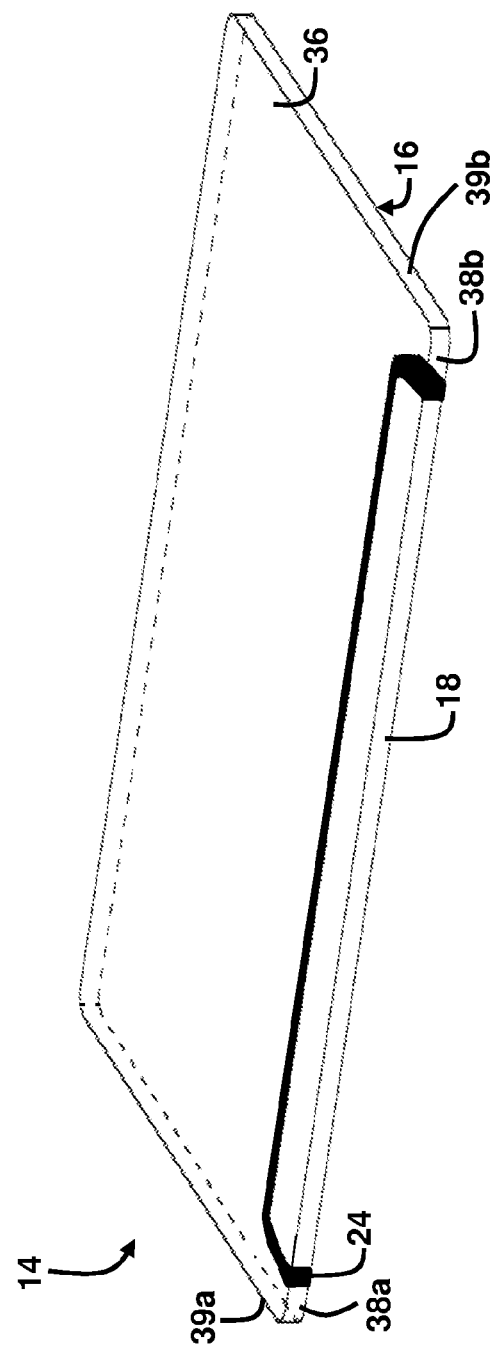

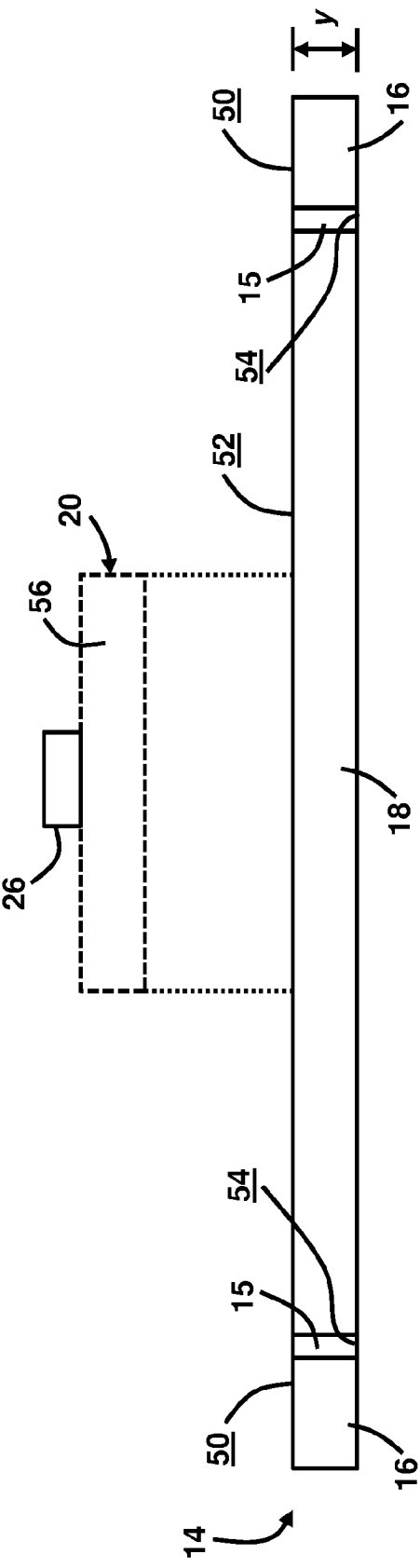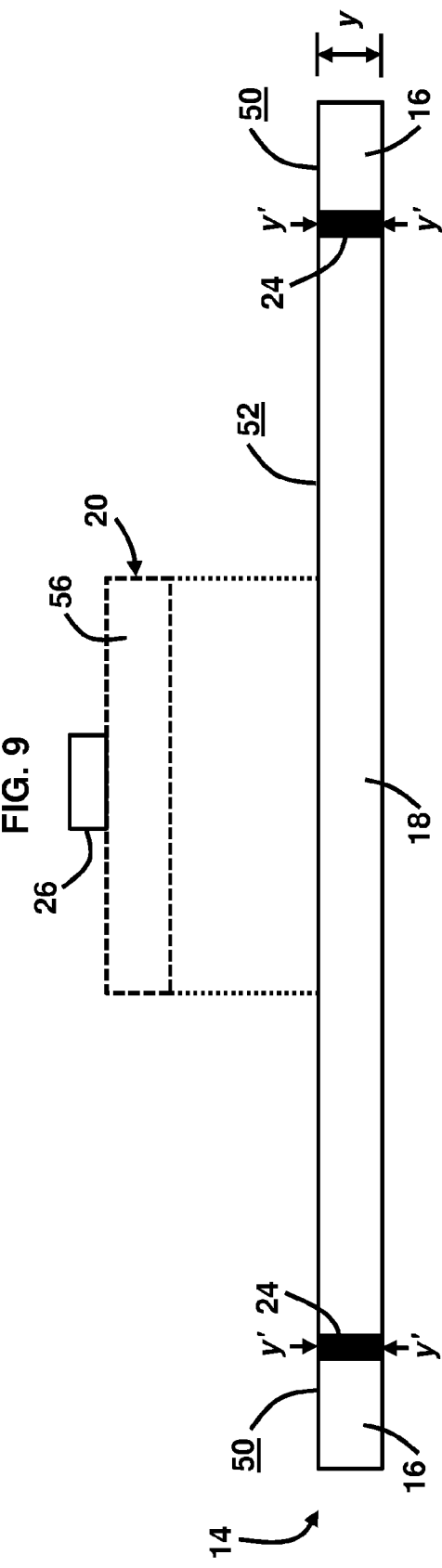

BASE COVERS ALIGNED FOR SLOT ANTENNAS ON CONVERTIBLE COMPUTING DEVICES

BACKGROUND

Convertible devices operate in both laptop and tablet computer configurations. They are configured to allow a user to switch between the two modes of operation: a laptop configuration and a tablet configuration. Wireless communication is permitted in both modes of operation using antennas configured into the device.

BRIEF DESCRIPTION OF THE DRAWINGS

FIG. 1A is a schematic diagram illustrating an upper and lower housing of a first convertible device in a tablet configuration, according to an example.

FIG. 1B is a schematic diagram illustrating an upper and lower housing of a second convertible device in a tablet configuration, according to an example.

FIG. 2 is a schematic diagram illustrating a convertible device in a tablet configuration, according to an example.

FIG. 7 is a perspective view of the lower housing of FIG. 6, according to an example.

FIG. 8 is a rear edge view of the lower housing of FIG. 4, according to an example.

FIG. 9 is a rear edge view of the lower housing of FIG. 6, according to an example.

DETAILED DESCRIPTION

Figure 3:
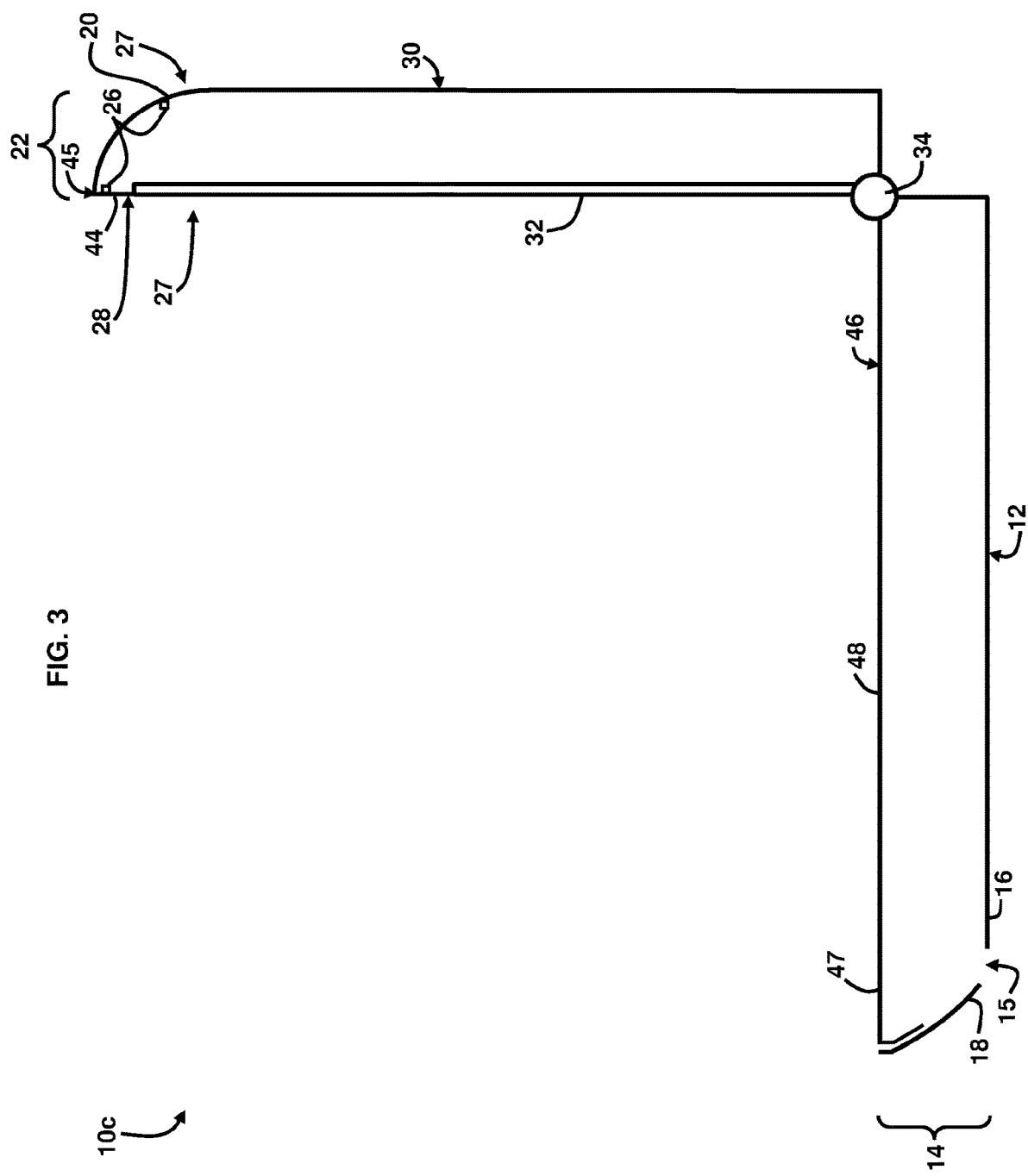
FIG. 3 is a schematic diagram illustrating a convertible device in a laptop configuration, according to an example.

The examples described herein provide a new configuration for a base cover that is aligned for a slot antenna on laptops, notebooks, and tablet computers; e.g., convertible devices, to help reduce the antenna gain degradation. The convertible devices, whether used in laptop or tablet configurations include antennas, which are typically used for wireless communications. The radio frequency clearance for the antenna signal should be unobscured to enhance the signal in either mode of operation.

Convertible devices may be configured in either a laptop mode or a tablet mode. Convertible devices may include a linking member, a lower housing (e.g., a keyboard housing), and an upper housing (e.g., display housing). The linking member, such as a pair of hinges, may rotatably interconnect the lower housing with the upper housing. In the laptop mode, the convertible device may be used as a regular laptop. In the laptop mode, the lower housing may form an angle between approximately 90° and 180° relative to the upper housing with the linking member attached at the back of the upper housing. In the tablet mode, the upper housing may be substantially parallel to and adjacent to the lower housing of the convertible device.

Examples described herein may provide a convertible device including an upper housing and a lower housing to couple with the upper housing. The cover of the lower housing is segmented into multiple metal parts with a spacing between the multiple metal parts. The segmented cover under the wireless local area network (WLAN) antenna slot area may not cause significant frequency shift when the convertible device is changed from the laptop mode to the tablet mode. The term "antenna slot" may refer to an opening or a portion of the screen cover that corresponds to an antenna region of the convertible device.

FIG. 1A is a schematic diagram illustrating an upper housing 22 and lower housing 14 of a first convertible device 10a in a tablet configuration, according to an example. A base cover 12 for a lower housing 14 of a convertible computing device 10a comprises a first metallic structure 16 positioned in the lower housing 14, and a single second metallic structure 18 electrically isolated from the first metallic structure 16, wherein the second metallic structure 18 is positioned in the lower housing 14 and directly below an antenna slot 20 defined in an upper housing 22 of the convertible computing device 10 when the upper housing 22 is positioned over and parallel to the lower housing 14. As used herein, the terms "metallic structure" and "metal body" are used interchangeably. In the example of the first convertible device 10a shown in FIG. 1A, the first metallic structure 16 and the second metallic structure 18 are spaced apart from one another, without any material or intervening structure therebetween. Accordingly, in device 10a, the first metallic structure 16 and the second metallic structure 18 do not mechanically contact one another and do not electrically connect with one another. FIG. 1B, with reference to FIG. 1A, is a schematic diagram illustrating an upper housing 22 and lower housing 14 of a second convertible device 10b in a tablet configuration, according to an example, wherein the base cover 12 comprises a non-metallic structure 24 positioned in between the first metallic structure 16 and the second metallic structure 18. The non-metallic structure 24 may comprise a plastic structure, such that the plastic material may be filled by injection molding, for example.

FIG. 2, with reference to FIGS. 1A and 1B, is a schematic diagram illustrating a convertible device 10c in a tablet configuration, according to an example. FIG. 3, with reference to FIGS. 1A through 2, is a schematic diagram illustrating the convertible device 10c in a laptop configuration, according to an example. The convertible device 10c is arranged in a clamshell configuration having a track pad 47 located on a same cover 46 as a keyboard 48. The clamshell configuration may have two sections: the display upper housing 22 and the keyboard lower housing 14. There are four cover surfaces in the example described herein: "A" cover (i.e., a screen cover/display cover 30 of the display upper housing 22) opposite to a display, "B" cover (i.e., a bottom cover 28 of the display upper housing 22) on which the display screen 32 is visible, "C" cover (i.e., top cover 46 of the lower housing 14) on which the keyboard 48 and track pad 47 are located, and "D" cover (i.e., base cover 12 of the lower housing 14) on which the device 10c rests. One or more antennas 26 used for wireless communications may be located at an upper edge of the display upper housing 22 for radio frequency clearance.

For convertible devices, such as convertible device 10c, the antenna(s) 26 may need to work for both the tablet mode shown in FIG. 2 and the laptop/notebook mode shown in FIG. 3. However, the antenna(s) 26 may be tuned for one mode and de-tuned for the other mode. The antenna(s) 26 may also be positioned in the display side 27 close to a front bezel 44 and a top 45 of the display upper housing 22. The first metallic structure 16 is electrically coupled to the WLAN antenna 26 positioned in the upper housing 22, in one example.

Antenna 26 may be positioned to connect convertible device 10 with a wireless network, such as WLAN networks, broadband wireless access (BWA) networks, ultra-wideband (UWB) networks, Bluetooth® systems, or cellular-type systems. Examples of antenna 26 may include, but are not limited to, a slot antenna, a dipole antenna, monopole antenna, loop antenna, microstrip antenna, or other types of antennas suitable for transmission of radio-frequency (RF) signals. For example, the antenna 26 may be a slot-based antenna formed from antenna slot 20 in a ground plane structure such as a cover 30 of convertible device 10c.

The electronic computing device 10c comprises first housing 22 comprising a first side 27 and a second side 29 facing away from the first side 27. The second side 29 comprises the antenna slot 20 for the WLAN antenna 26. The second housing 14 is rotatably connected to the first housing 22 by a hinge 34 for selective configuration between a laptop mode of use, as shown in FIG. 3, and a tablet mode of use, as shown in FIG. 2. The second housing 14 comprises metal cover 12. The metal cover 12 comprises a first metal body 16, a second metal body 18 spaced apart and unconnected from the first metal body 16. In one example, the spacing 15 between the first metal body 16 and the second metal body 18 is unfilled. In another example, as indicated in FIG. 1B, a non-metal body 24 is positioned in between the first metal body 16 and the second metal body 18. In the tablet mode of use as provided in FIG. 2, the first metal body 16 is positioned substantially parallel and adjacent to the second side 29 of the first housing 22, wherein in the tablet mode of use, the second metal body 18 is positioned directly below the antenna slot 20. According to the examples described herein, the first metal body 16 is electrically isolated from the second metal body 18. In one example, the first metal body 16 comprises the same metal material as the second metal body 18. In another example, the first metal body 16 comprises a different metal material as the second metal body 18. Any of the first metal body 16 and the second metal body 18 may comprise aluminum, a metal alloy, or any other suitable metal material.

Figure 4:
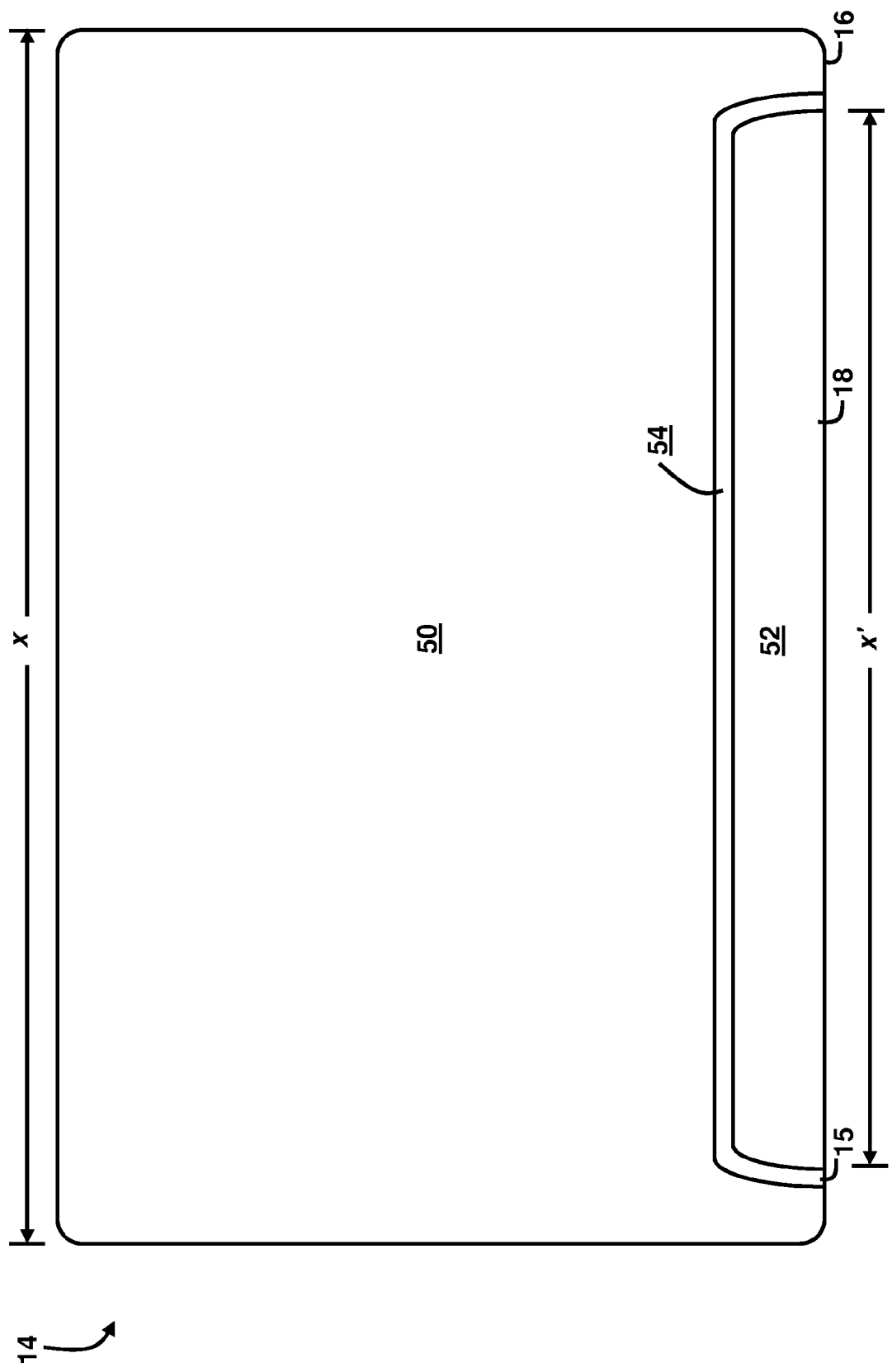
FIG. 4 is a bottom view illustrating the lower housing of a first convertible device, according to an example.

FIG. 4, with reference to FIGS. 1A through 3, is a bottom view illustrating the lower housing 14, according to an example. The first metal body 16 is shown separated from the second metal body 18 by spacing 15. In an example, the second metal body 18 is shown as a single continuous structure having no gaps and extending substantially, although not fully, along the full length x of the base cover 12. In an example, the length x' of the second metal body 18 is approximately 75-90% of the length x of the base cover 12; e.g., the length x of the first metal body 16. The configuration of the length x' of the second metal body 18 permits the second metal body 18 to ensure proper positioning under the antenna window 20. The first metal body 16 comprises a surface 50 and the second metal body 18 comprises a surface 52, such that surfaces 50, 52 are planar with respect to one another, in one example. In another example, surfaces 50, 52 are non-planar with respect to one another. In one example, the spacing 15 comprises a bottom surface 54 that is non-planar with respect to surfaces 50, 52, wherein the surface 54 may be recessed with respect to surfaces 50, 52.

Figure 5:
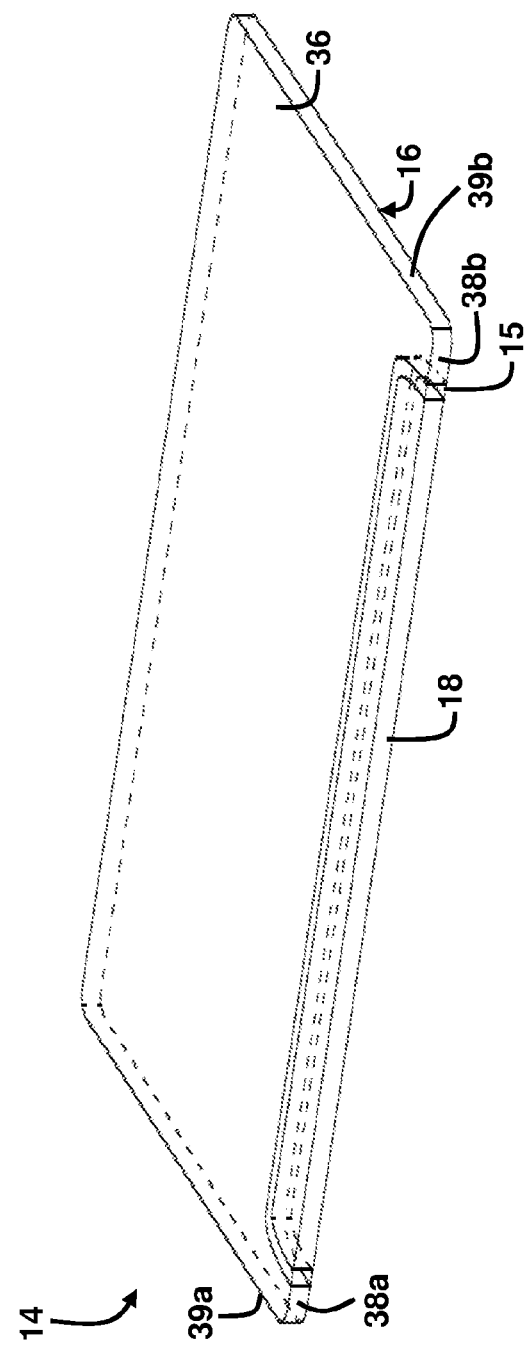
FIG. 5 is a perspective view of the lower housing of FIG. 4, according to an example.

FIG. 5, with reference to FIGS. 1A through 4, is a perspective view of the lower housing 14, according to an example. The first metal body 16; e.g., metallic structure, is larger in size than the second metal body 18; e.g., metallic structure, in an example. The spacing 15 may comprise a substantially U-shaped configuration. In one example, the first metal body 16; e.g., metallic structure, comprises a first portion 36, and a pair of second portions 38a, 38b extending from the first portion 36. The first portion 36 and second portions 38a, 38b may comprise a continuous structure in one example. The second metal body 18; e.g., metallic structure, is positioned in between the pair of second portions 38a, 38b. In one example, the second metal body 18 may be substantially centrally aligned with respect to the side edges 39a, 39b of the first metal body 16.

Figure 6:
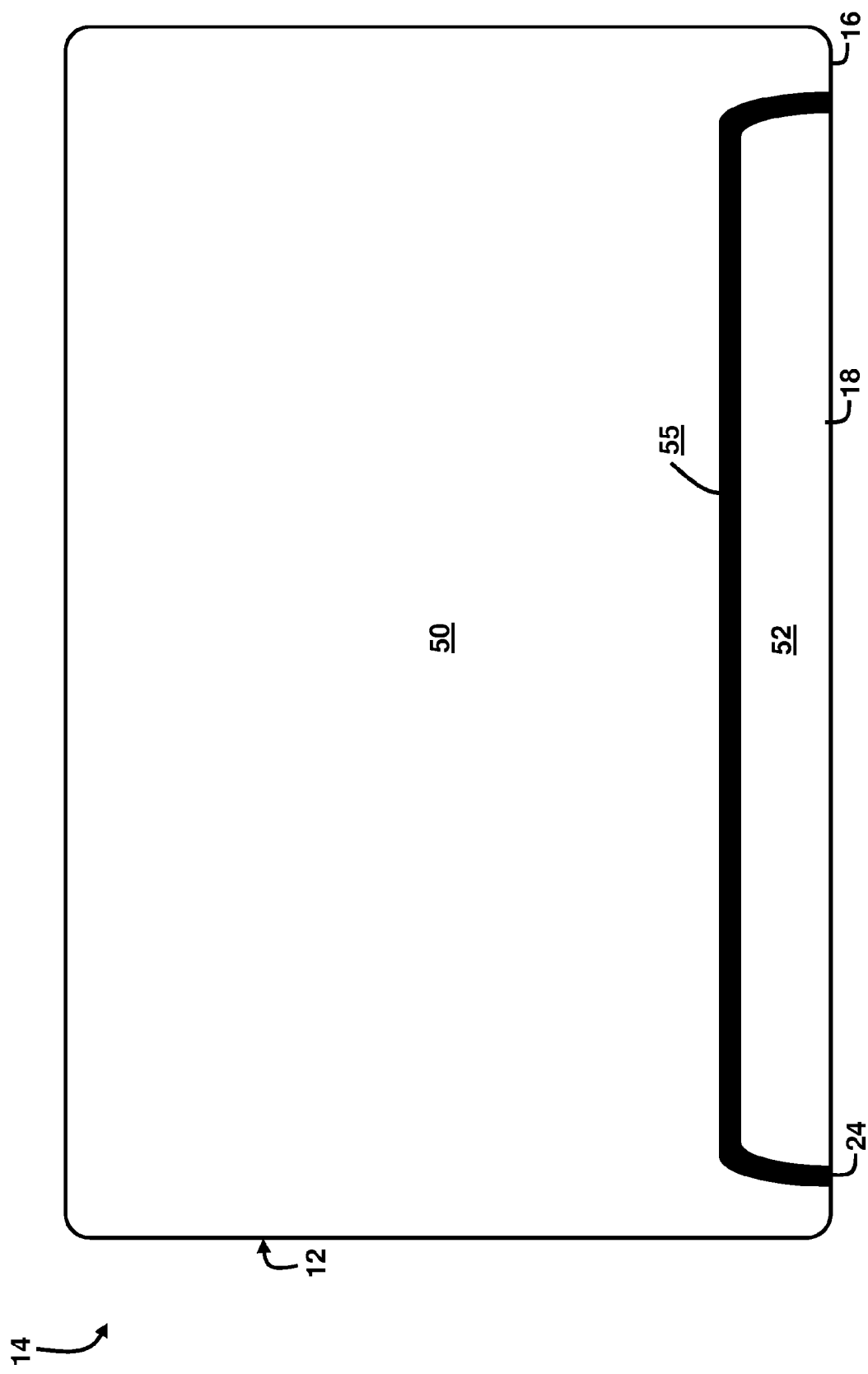
FIG. 6 is a bottom view illustrating the lower housing of a second convertible device, according to an example.

FIG. 6, with reference to FIGS. 1A through 5, is a bottom view illustrating the lower housing 14, according to an example. As shown in FIG. 6, the lower housing 14 comprises a segmented base cover 12 comprising the plurality of metallic structures; e.g., metal bodies 16, 18, electrically isolated from one another, and a non-metallic structure 24 separating the plurality of metallic structures 16, 18 from one another, wherein the first metallic structure 16 of the plurality of metallic structures 16, 18 is structurally separated from the second metallic structure 18 of the plurality of metallic structures 16, 18. The non-metallic structure 24 shown in FIG. 6 fills the spacing 15 of FIGS. 4 and 5. In one example, the non-metallic structure 24, which may be plastic, fills the entire spacing 15 such that the non-metallic structure 24 comprises an upper surface 55 that is planar with respect to surfaces 50, 52 of the first metallic structure 16 and second metallic structure 18, respectively. In another example, the upper surface 55 of the non-metallic structure 24 may be recessed or raised with respect to surfaces 50, 52.

FIG. 7, with reference to FIGS. 1A through 6, is a perspective view of the lower housing 14, according to an example. The non-metallic structure 24 may comprise a substantially U-shaped structure in one example. Other shapes and configurations of the non-metallic structure 24 are also possible. While the non-metallic structure 24 may comprise plastic, any suitable material may be utilized which electrically isolates the first metal body 16 from the second metal body 18.

FIG. 8, with reference to FIGS. 1A through 7, is a rear edge view of the lower housing 14 in relation to the antenna slot 20, according to an example. FIG. 9 is a rear edge view of the lower housing 14 with a non-metallic structure 24 set between the first metal body 16 and the second metal body 18, and in relation to the antenna slot 20, according to an example. The height y of the first metal body 16 and second metal body 18 may be the same such that the first metal body 16 and second metal body 18 have planar upper surfaces 50, 52, respectively. In another example, the height y of the first metal body 16 and the second metal body 18 may be different. According to an example, the spacing 15 comprises a bottom surface 54 that is non-planar with respect to surfaces 50, 52, wherein the surface 54 may be recessed with respect to surfaces 50, 52. The height y' of the non-metallic structure 24 may be the same or different compared with the height y of any of the first metal body 16 or the second metal body 18. In this regard, the non-metallic structure 24 may be recessed or raised compared with the first metal body 16 or the second metal body 18.

As described in the various examples herein, the convertible device 10a-10c articulates between a laptop mode of use and a tablet mode of use. The upper housing 22 comprises the display screen 32 positioned on the first side 27, wherein the display screen 32 may be a touch screen. The cover 30 is positioned on the second side 29 of the upper housing 22, such that the second side 29 is on the opposite side of the upper housing 22 compared with the first side 27. The cover 30, which comprises the antenna slot 20, may be formed of conductive materials, insulating materials, or a combination of both. In examples in which cover 30 is formed from plastic or other dielectric materials, antenna signals can pass through cover 30. The antenna 26 may be mounted behind a portion of cover 30. In configurations in which the cover 30 is formed from a conductive material such as metal or a metal alloy, one or more radio-transparent antenna slots 20 are positioned in the upper housing 22. As an example, the upper housing 22 may have antenna slots 20 that are filled with antenna covers 56, as shown in FIGS. 8 and 9. The antenna 26 may be mounted behind the antenna covers 56 and may transceive antenna signals through the antenna covers 56.

In an example, the antenna cover 56 on cover 30 that covers antenna 26 may comprise non-metallic material so that wireless communications signal may not be absorbed by the antenna cover 56, thus the transceiving capability of antenna 26 may not be degraded by the antenna cover 56. For example, the antenna cover 56 may be a plastic cover or a cover made of dielectric material.

To permit the articulation between the laptop mode and tablet mode, the lower housing 14 is coupled to the upper housing 22. In an example, the second metallic structure 18 is aligned with the antenna slot 20, and the antenna 26 that is positioned in the antenna slot 20. In another example, in the tablet mode of use, the second metallic structure 18 is positioned directly below the antenna slot 20, and the antenna 26 that is positioned in the antenna slot 20. The hinge 34 is provided to couple the upper housing 22 to the lower housing 14. Connection mechanisms other than a hinge 34 may also be provided to support the articulation between the laptop mode and tablet mode of use. For example, a detaching/reattaching mechanism may be provided to allow the upper housing 22 to completely separate from the lower housing 14 to allow a user to flip the upper housing 22 with respect to the lower housing 14 and then reconnect/reattach the upper housing 22 to the lower housing 14.

The examples provide a cover 12 that is divided into separate metal segments 16, 18. In such a configuration, the "D" cover metal segment 18, which is under the antenna slot area 20 no longer acts as a reflector only, but rather metal segment 18 acts as a parasitic metal, which is electrically coupled with the antenna 26 on the hinge up configuration; e.g., laptop mode, to make a contribution to radiation. Also, since the segmented metallic structure 18 is isolated from other the other "D" cover metal segment 16, the radiated energy is less constrained between the metal "A" cover 30 and the metal "D" cover 12.

Figure 10:
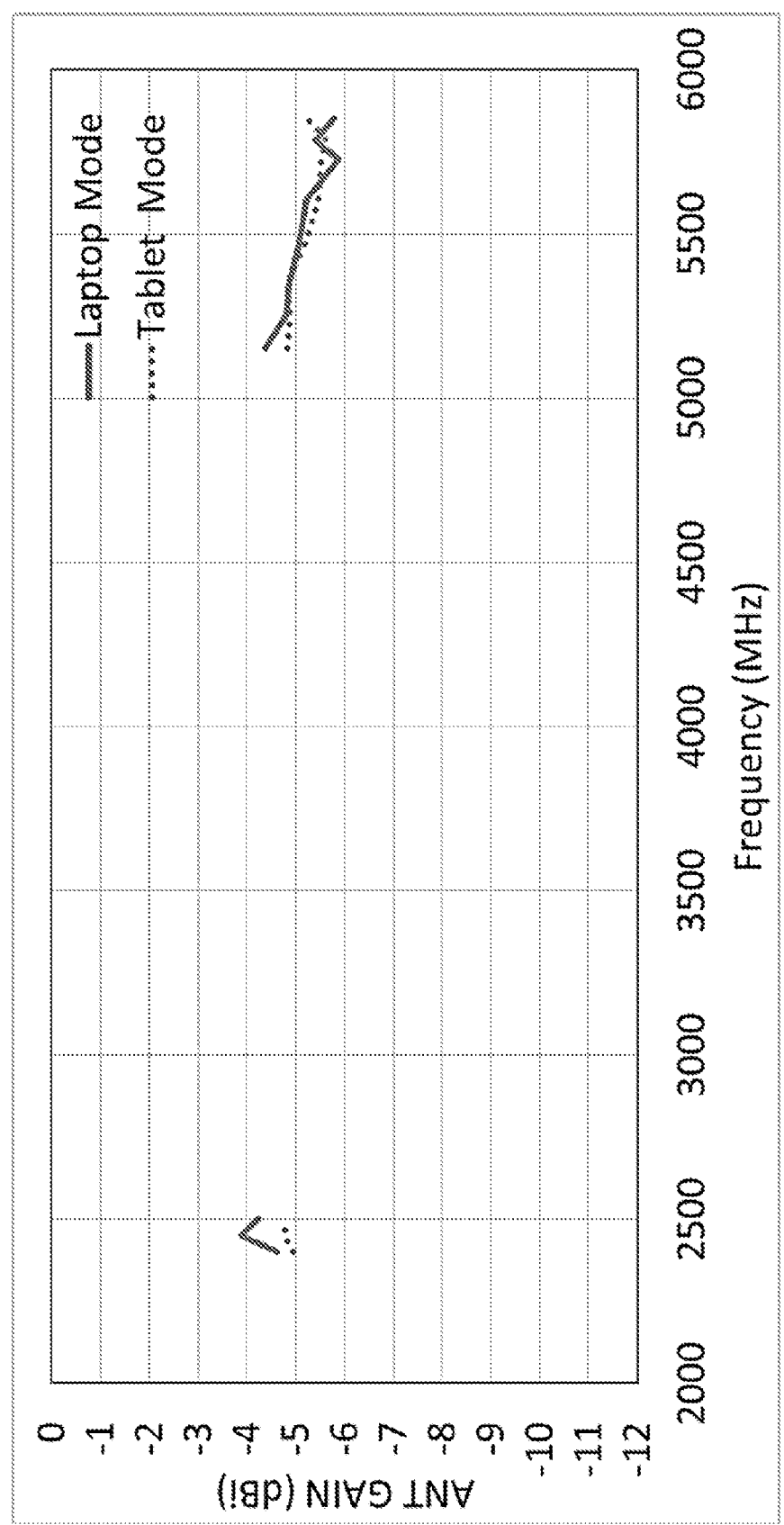
FIG. 10 is a graph illustrating the antenna gain vs. the frequency for each of the tablet mode and laptop mode of operation of a convertible device, according to an example.

The segmented "D" cover metal configuration improves antenna gain when oriented as a tablet device and therefore is able to minimize the antenna gain performance gap between the laptop mode and tablet mode. Additionally, the examples described also may be utilized for similar device user scenarios in which the antenna 26 is close to the "D" cover 12. The antenna gain is substantially similar in the laptop mode of use and the tablet mode of use, according to an example, as shown in the graph of FIG. 10, with reference to FIGS. 1A through 9. The graph of FIG. 10 depicts an example of a dual band WLAN antenna 26 having a frequency range of 2.4-2.5 GHz and 5150-5850 MHz for low and high band, respectively.

The present disclosure has been shown and described with reference to the foregoing exemplary implementations. Although specific examples have been illustrated and described herein it is manifestly intended that the scope of the claimed subject matter be limited only by the following claims and equivalents thereof. It is to be understood, however, that other forms, details, and examples may be made without departing from the spirit and scope of the disclosure that is defined in the following claims.

What is claimed is:

1. A base cover for a lower housing of a convertible computing device, comprising:
    a first metallic structure positioned in the lower housing; and
    a single second metallic structure electrically isolated from the first metallic structure,
    wherein the second metallic structure is positioned in the lower housing and directly below an antenna slot defined in an upper housing of the convertible computing device when the upper housing is positioned over and parallel to the lower housing.

2. The base cover of claim 1, wherein the first metallic structure and the second metallic structure are spaced apart from one another.

3. The base cover of claim 1, comprising a non-metallic structure positioned in between the first metallic structure and the second metallic structure.

4. The base cover of claim 3, wherein the non-metallic structure comprises a plastic structure.

5. The base cover of claim 1, wherein the first metallic structure is electrically coupled to a wireless local area network (WLAN) antenna positioned in the upper housing.

6. An electronic computing device comprising:
    a first housing comprising:
        a first side; and
        a second side facing away from the first side and comprising an antenna slot for a wireless local area network (WLAN) antenna;
    a second housing rotatably connected to the first housing for selective configuration between a laptop mode of use and a tablet mode of use, wherein the second housing comprises a metal cover comprising:
        a first metal body;
        a second metal body spaced apart and unconnected from the first metal body; and
        a non-metal body positioned in between the first metal body and the second metal body,
    wherein in the tablet mode of use, the first metal body is positioned substantially parallel and adjacent to the second side of the first housing, and
    wherein in the tablet mode of use, the second metal body is positioned directly below the antenna slot.

7. The electronic computing device of claim 6, wherein the first metal body is electrically isolated from the second metal body.

8. The electronic computing device of claim 6, wherein first metal body comprises a same metal material as the second metal body.

9. The electronic computing device of claim 6, wherein the first metal body comprises a different metal material as the second metal body.

10. A convertible device articulating between a laptop mode of use and a tablet mode of use, comprising:
    an upper housing comprising:
        a display screen positioned on a first side; and
        a cover positioned on a second side opposite the first side, wherein the cover comprises an antenna slot;
    a lower housing coupled to the upper housing, wherein the lower housing comprises a segmented base cover comprising:

a plurality of metallic structures electrically isolated from one another; and a non-metallic structure separating the plurality of metallic structures from one another, wherein a first metallic structure of the plurality of metallic structures is structurally separated from a second metallic structure of the plurality of metallic structures, and wherein the second metallic structure is aligned with the antenna slot;

a hinge coupling the upper housing to the lower housing; and an antenna positioned in the antenna slot.

11. The convertible device of claim 10, wherein the first metallic structure is larger in size than the second metallic structure.

12. The convertible device of claim 10, wherein the non-metallic structure comprises a substantially U-shaped structure.

13. The convertible device of claim 10, wherein the first metallic structure comprises a first portion, and a pair of second portions extending from the first portion, and wherein the second metallic structure is positioned in between the pair of second portions.

14. The convertible device of claim 10, wherein in the tablet mode of use, the second metallic structure is positioned directly below the antenna slot.

15. The convertible device of claim 10, wherein an antenna power gain is substantially similar in the laptop mode of use and the tablet mode of use.

* * * * *